(12) United States Patent
De Angelis et al.

(10) Patent No.: US 9,098,636 B2
(45) Date of Patent: Aug. 4, 2015

(54) WHITE-BOX TESTING SYSTEMS AND/OR METHODS IN WEB APPLICATIONS

(71) Applicant: Software AG, Darmstadt (DE)

(72) Inventors: Rocco De Angelis, Schwalbach (DE); Vittorio De Angelis, Schwalbach (DE)

(73) Assignee: SOFTWARE AG, Darmstadt (DE)

( * ) Notice: Subject to any disclaimer, the term of this patent is extended or adjusted under 35 U.S.C. 154(b) by 0 days.

(21) Appl. No.: 14/132,794

(22) Filed: Dec. 18, 2013

(65) Prior Publication Data
US 2015/0169434 A1    Jun. 18, 2015

(51) Int. Cl.
*G06F 9/44* (2006.01)
*G06F 11/36* (2006.01)

(52) U.S. Cl.
CPC ........ *G06F 11/3688* (2013.01); *G06F 11/3692* (2013.01)

(58) Field of Classification Search
CPC .................................................. G06F 9/44589
See application file for complete search history.

(56) References Cited

U.S. PATENT DOCUMENTS

| | | | | |
|---|---|---|---|---|
| 8,826,068 | B2 * | 9/2014 | Somendra | 714/6.3 |
| 2004/0103394 | A1 * | 5/2004 | Manda et al. | 717/126 |
| 2004/0210866 | A1 * | 10/2004 | Friedman et al. | 717/106 |
| 2007/0124367 | A1 * | 5/2007 | Fan et al. | 709/203 |
| 2007/0143678 | A1 | 6/2007 | Feigenbaum | |
| 2010/0146420 | A1 | 6/2010 | Bharadwaj et al. | |
| 2013/0132774 | A1 * | 5/2013 | Somendra | 714/32 |

OTHER PUBLICATIONS

Svetoslav Ganov et al., "Barad—A GUI Testing Framework Based on Symbolic Execution," Laboratory of Experimental Software Engineering, University of Texas at Austin Software Testing and Verification Group [online] [retrieved Oct. 5, 2012] http://users.ece.utexas.edu/~perry/work/papers/080521-SG-barad.pdf.
UISpec4J: Java/Swing GUI Testing Made Simple! [online] [retrieved Oct. 5, 2012] http://www.uispec4j.org/.
Froglogic—Squish GUI Testing [online] [retrieved Oct. 5, 2012] http://www.froglogic.com/squish/gui-testing/.
Abbot Framework for Automated Testing of Java GUI Components and Programs, "Getting Started with the Abbot Java GUI Test Framework—Building Unit Tests and Functional Tests (AWTUnit/SwingUnit)" [online] [retrieved Oct. 5, 2012] http://abbot.sourceforge.net/doc/overview.shtml.
Maveryx—The World's Most Innovative Java Testing Software [online] [retrieved Oct. 5, 2012] http://www.maveryx.com/.
Bredex—GUIdancer/Jubula [online] [retrieved Oct. 5, 2012] http://www.bredex.de/web/index.php/guidancer_jubula_en.html.
Eclipse Jubula Project—Jubula Functional Testing Tool [online] [retrieved Oct. 5, 2012] http://eclipse.org/jubula/.

(Continued)

*Primary Examiner* — Philip Wang
(74) *Attorney, Agent, or Firm* — Nixon & Vanderhye, P.C.

(57) ABSTRACT

Certain example embodiments relate to white-box testing techniques, e.g., for graphical user interfaces (GUIs). Responsive to a first parameter received from a test suite executer, test bootstrap code included in an application is executed, where the application and the test suite executer run in the same browser. A test case to be run on the application and a test case executer to execute the test case are retrieved by the executed test bootstrap code. The retrieved test case is executed in a same context of the browser as the application. Results from executing the test case are stored.

19 Claims, 7 Drawing Sheets

(56) References Cited

OTHER PUBLICATIONS

QFS Professional Test Automation: QF Test—The GUI Test Tool for Java and Web [online] [retrieved Oct. 5, 2012] http://www.qfs.de/en/qftest/index.html.

Aost—Tellurium Automated Testing Framework [online] [retrieved Oct. 5, 2012] http://code.google.com/p/aost/.

Wikipedia—List of GUI Testing Tools [online] [retrieved Oct. 5, 2012] http://en.wikipedia.org/wiki/List_of_GUI_testing_tools.

* cited by examiner

WHITE-BOX TESTING SYSTEMS AND/OR METHODS IN WEB APPLICATIONS

TECHNICAL FIELD

Certain example embodiments described herein relate to systems and/or methods for testing software applications in web browser environments, and aspects thereof. More particularly, certain example embodiments relate to white-box testing techniques, e.g., for graphical user interfaces (GUIs). Certain example embodiments advantageously provide techniques that potentially address problems typically encountered when applications are tested in production environments.

BACKGROUND AND SUMMARY OF EXAMPLE EMBODIMENTS OF THE INVENTION

Software testing can be an important step during the software development cycle, e.g., that helps verify whether the software meets defined requirements and works as expected. In modern software development techniques such as the iterative and incremental agile software development approaches, software testing is a continuing process. Compared to traditional software development processes, in which most of the testing efforts oftentimes occur after the software coding stage has been completed, in iterative and agile techniques, the software is tested continuously before it is released. The agile approach generally involves software programmers testing the software completely after each software enhancement or change, e.g., to help ensure the software works as intended and is deliverable to a customer and/or to a production environment after each development cycle. Such development approaches therefore can require frequent execution of automated testing. For example, with the iterative and/or agile approaches, it may be necessary for a programmer to test the software each time a feature is coded or completed, every time code is checked into a version control system, etc.

Test automation or in general software testing methods can be distinguished into white- and black-box tests. White-box tests use knowledge about the internal structure and workings of the software and can check if internal application programming interfaces (APIs) work as expected or whether the internal state of the program is correct. White-box tests can be applied at the unit, integration, and system levels of the software testing process.

Black-box tests require no knowledge about the internal implementation and treat the software under test like a "black box". Black-box tests may be performed in addition to white-box tests, and may also be applied to the acceptance level of software testing. One kind of acceptance tests is the graphical user interface (GUI) test. A GUI test involves program code that tries to reproduce the interaction that is performed by the user on the interface, e.g., by clicking with the mouse on controls, by entering any kind of input via the keyboard, etc. After the interaction part is finished, the test code compares the output results with the expected results. This code can be written manually by the programmer or automatically recorded by using corresponding automation tools that allow recording of all interactions on the interface and transforming them into a corresponding code (e.g., playback script).

GUI tests have the disadvantage that they are very sensitive to changes on the user interface (UI). For example, GUI tests would require frequent changes to the test code because the agile approach demands very frequent changes (iterations) of the software. As a solution to such problems, it is useful to implement GUI tests that are realized as black-box as well as white-box tests. The software pattern known as the "model view presenter," which is a common approach for the implementation of modern web applications, follows this idea.

Most of the existing frameworks for web browser graphical user interface tests (e.g., Selenium) are divided into a component that offers an application programming interface (API) to define the interaction and to check the expected result, as well as a component that executes the defined interaction in the web browser. The component that executes the defined test interactions use the native automation APIs provided by the browsers. These native APIs of the browser allow checking the state of the document object model (DOM) structure in the browser. As such, this approach enables to check the internal state of an application and to implement white-box tests.

Modern web applications, which are frequently implemented in JavaScript, are optimized by a pre-compiler step. Some or all of the following and/or other common pre-compiler steps can make it difficult and sometimes even impossible for existing test frameworks to test the production system: code translation/generation (e.g., from Java to JavaScript), creation of code variations (e.g., for cross-browser support), code optimization, obfuscation of code, etc.

Such changes to the code during compiling and/or obfuscation may cause the behavior of the application to dramatically change in a production environment. In addition, all these steps result in an auto-generated production code that differs from the original code. Because of the code translation, generation, and the obfuscating steps, the code structure itself may be changed, e.g., possibly involving changes to function and variable names, etc. Thus, testing such compiled and/or obfuscated application code on production environments using existing white-box test frameworks can become very difficult and sometimes even impossible, not to mention expensive.

It thus will be appreciated that existing approaches to white-box testing of GUI web applications are disadvantageous to the extent that they require additional tools (software) to test the installed production environment, with such test tools often being platform- and/or target-system specific; quite often require that test code be written in a different programming language as the implementation language of the production code; are difficult for the end user to execute the test cases to validate his/her environment (e.g., after an installation to verify if the environment works correctly); etc.

Certain example embodiments help address these and/or other issues. For instance, an example method embodiment for testing an application includes, responsive to a first parameter received from a test suite executer, executing test bootstrap code included in the application, where the application and the test suite executer are running in a browser. The method also includes the executed test bootstrap code retrieving a test case to be run on the application and a test case executer to execute the test case, executing the retrieved test case in a same context of the browser as the application, and storing results from executing the retrieved test case.

According to an aspect of certain example embodiments, the test bootstrap code is compiled together with code of the application.

According to another aspect of certain example embodiments, the retrieving includes requesting, by the executed test bootstrap code, the test case from a remote computer; responsive to the requesting, receiving the test case and the test case executer; and injecting the received test case and the test case executer to the application.

In another aspect of certain example embodiments, executing the retrieved test case includes performing the execution of the test case by the injected test case executer.

The method may include calling one or more internal functions of the application from within the injected test case code, in certain example embodiments.

The method may include starting the test suite executer in the browser, where the starting includes loading code of the test suite executer from a computer, injecting the loaded code of the test suite executer to a page of the browser, and executing the injected code of the test suite executer to provide the first parameter to the application.

An example computer system embodiment for testing an application includes first processing resources including at least one processor and a memory. The processor is configured to perform, responsive to a first parameter received from a test suite executer, executing test bootstrap code included in the application, where the application and the test suite executer are running in a browser. The processor is further configured to perform the executed test bootstrap code retrieving a test case to be run on the application and a test case executer to execute the test case, executing the retrieved test case in a same context of the browser as the application, and storing results from executing the retrieved test case.

Another example computer system embodiment includes second processing resources communicatively connected to the first processing resources over a network, and storage connected to the second processing resources. The storage stores a plurality of test cases, each said test case including (a) interactions between the application and components external to the application that were gathered during a run of the application and received user input from a user, and (b) assertions to be made to the application once the application reaches a desired test state. Retrieving the test case includes requesting, by the executed test bootstrap code, the test case from the second processing resources, responsive to the requesting, receiving the test case and the test case executer from the storage, and injecting the received test case and the test case executer to the application.

An example non-transitory computer readable storage medium includes instructions stored thereon, which when executed by a computer, causes the computer to perform operations for testing an application. The operations include, responsive to a first parameter received from a test suite executer, execute test bootstrap code included in the application, where the application and the test suite executer are running in a browser. The operations also include the executed test bootstrap code retrieving a test case to be run on the application and a test case executer to execute the test case, executing the retrieved test case in a same context of the browser as the application, and storing results from executing the retrieved test case.

These aspects, features, and example embodiments may be used separately and/or applied in various combinations to achieve yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Certain example embodiments relate to white-box testing techniques, e.g., for graphical user interfaces (GUIs). Certain example embodiments may be used for white-box testing web applications in production environments.

While enabling white-box testing, certain example embodiments advantageously maintain the test code separately from the production code. Maintaining the separation between the test code and the production software code is desirable for several reasons including, for example, to reduce the size of code that is delivered from the server and increases the startup time of the application. Certain example embodiments address the limitation of conventional test approaches where, when test code is not compiled and/or obfuscated together with the packaged or delivered production code, it becomes difficult to perform white-box tests with that production code.

Certain example embodiments provide a framework system that allows for the execution of white-box tests on an obfuscated production web application, while clearly separating the production code from the test code. In certain example embodiments, the test code need not be pre-packaged with the production code, but can be later injected by the framework into the production code for the test execution and both executed in the same web browser context.

For certain example embodiments, no additional test software is required to be installed in order to validate any production environment after an installation. Because the test code runs in the same web browser, no additional features such as browser plugins are necessary for test execution, in some implementations. Moreover, all operation systems on which the web browser is available are supported in at least some implementations. In general, all web browsers in which the production code runs can be supported by the example embodiments described herein. This advantageously makes it also possible for the end user (e.g., customer) to validate his/her installation and to identify errors on his/her environment, e.g., regardless of the target browser, environment, etc.

Figure 1:
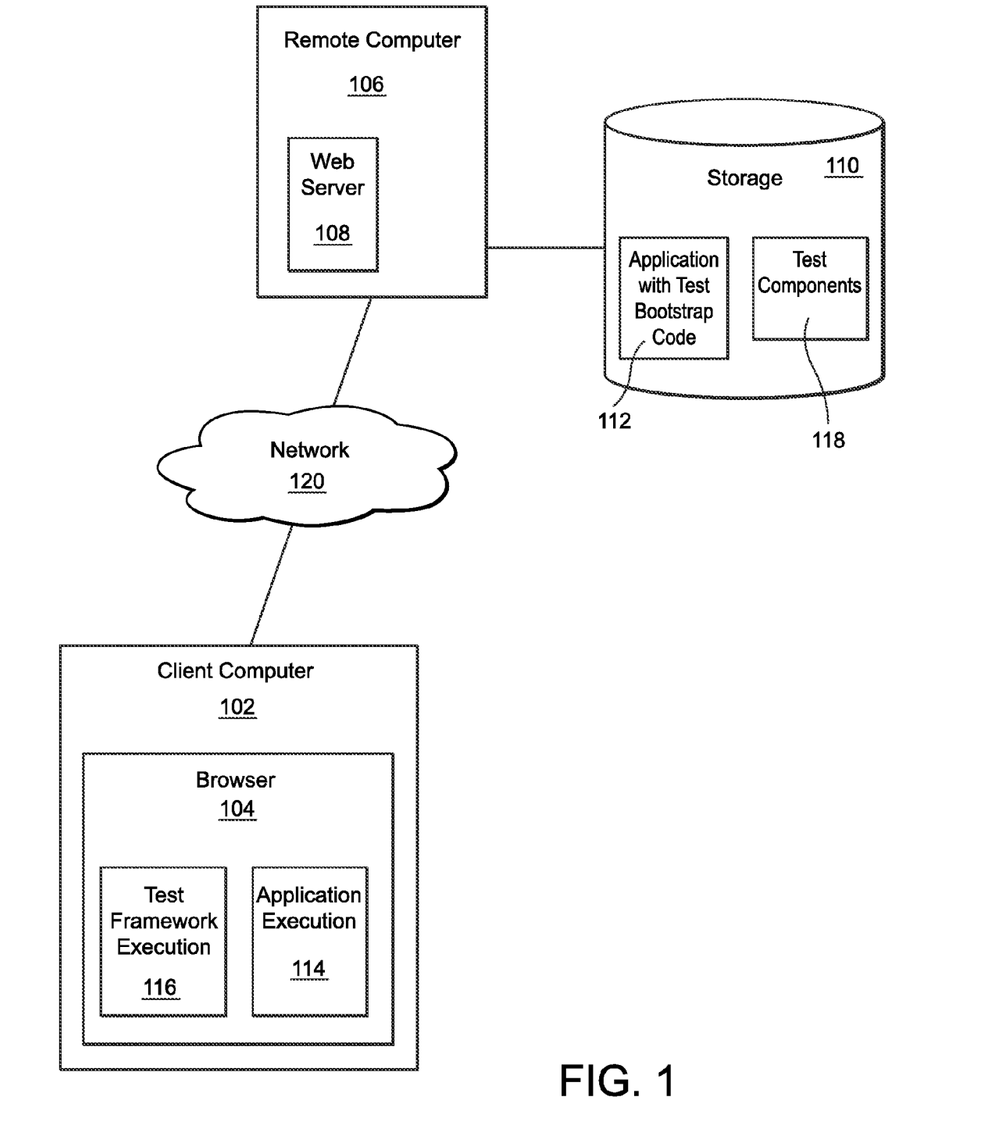
FIG. 1 depicts a computer system for testing web applications, according to certain example embodiments.

FIG. 1 depicts a system for testing applications, such as web-based GUI applications, according to certain example embodiments. A user at a client computer 102 interacts with a web server 108 running on a remote computer 106. The remote computer 106 and client computer 102 are connected by a network 120 such as, for example, the Internet. Web server 108 has access to storage 110 that has stored on it an application in which test bootstrap code has been included. Storage 110 may also have stored on it test components 118.

Using web browser (also referred to simply as "browser") 104, the user may access web server 108 to run application 112. Upon user access, application 112 is downloaded or otherwise made accessible to browser 104 and is executed (e.g., executing application 114). For purposes of performing tests upon executing application 114, some of the test components 118 may also be downloaded to client computer 102 and run in browser 104, e.g., as executing test framework 116.

Client computer 102 may be any type of computer, such as, for example, a personal computer, mobile computer, tablet computer, smart phone, etc., that has a processing system that includes one or more processors and memory. The memory may include volatile memory and/or non-volatile memory. Program instructions and/or data may be stored in memory and be read and processed by the one or more processors.

Remote computer 106 may include one or more server computers that are geographically distributed or co-located. Remote computer 106 includes one or more processors and memory, including volatile and non-volatile memory, for storage. Storage 110 may comprise one or more connected storage devices. For example, storage 110 may be cloud storage residing in geographically dispersed storage devices connected by the Internet.

Remote computer 106 and/or web server 108 may be part of a production environment. A "production environment" can be considered an environment where software products (including applications such as application 112) and associated other components are run for their intended use by end users such as actual customers. This is in contrast to a "development environment" or "test environment" where the applications are used by developers or testers. For example, in an online shopping business, upgrades to its web site (e.g., portal) may be coded and tested in a test environment by developers and testers, and ultimately the upgraded application software will be deployed in the production environment where customers visiting the online shopping portal through their browsers are served with the upgraded application software. Production code, a term that refers to application code placed in the production environment, for web applications are often compiled and/or obfuscated, as noted above, for various reasons. At least partial compilation and/or obfuscation may be an automatic and/or necessary part of the application deployment process, for instance. In other cases, it may be desirable to compile code for performance reasons. In still other cases, it may be desirable to obfuscate at least some sensitive portions of the code for security reasons.

Web server 108 and browser 104 may be any web server or browser that support the operations described below.

Test components 118 include a test suite executer, a test case bootstrapper, and a test case executer. Additionally, test components 118 may include test cases, and test suites that group the available test cases. Each test case may include test case code and a corresponding test case definition or template.

Example test cases include operations corresponding to user interactions with the application to be tested. Each test case may include (a) interactions between the application and components external to the application as the application runs and received user input from a user until a test state is reached, and (b) validations to be made to the application once the application reaches the test state. When executing a test case, the application is fed with interactions included in the test case through, for example, the test case executer, until the application reaches a known test state, until the test case ends, etc. Once the application reaches the test state or the test case ends, one or more assertions (e.g., validations) may be made of the variable and/or other parameter values in the application. The values returned may be compared with corresponding expected values to determine the test case resulted in a success or failure.

The test case definition (also referred to as test case template) for each test case uniquely identifies the test case, and may include a high level description of the test case. The test case may be identified by a unique identifier among all tests that are available to be run in a particular test framework. The test case definition may also identify where the corresponding test case code is available. Pre- and/or post-conditions for the test case execution may also be specified in the test case definition.

A test suite comprises a plurality of test cases. Each test suite may be identified by a unique suite identifier, and include a group of related test cases or test cases selected according to some predetermined criteria.

The test suite executer operates to load one or more test suites and test case definitions from a server, and to initiate the execution of each test case. Each test case may be executed in a separate browser tab. Each test case definition specifies which URL of the web application must be loaded to start and perform the corresponding test case. The test suite executer adds a specific bootstrap parameter (e.g., via the URL) from the test case definition to activate the test case bootstrapper. This bootstrap parameter contains a test identifier composed of the test suite identifier and the test case identifier that informs the test case bootstrapper which test code needs to be loaded from the server and injected into the production code to execute the test.

In some implementations, the test case bootstrapper is always available in the application, and is linked during the compile process into the production code. This makes it possible in certain example embodiments to execute white-box tests on each installed web application in which the bootstrapper code is available. The bootstrapper itself in some implementations may have only a few lines of code, e.g., thereby advantageously reducing the code size and/or the download time of the production code. The test case bootstrapper operates to retrieve the test case code from the server and for the injection of the code into the production code, as well as to run the text case executer.

Obtaining and executing the test case code proceeds in two steps. In the first step, the test case executer is loaded from the server and injected into the application. The test case executer code executes the test case and provides a set of help functions allowing the test case to simulate user interactions and to validate results of the interactions. After execution, the test case executer gets the result from the test case and communicates this result to the test suite executer using browser cookies and/or the browsers local web storage.

In the second step, the test case code JavaScript file is loaded from the server and injected into the production code. This allows the test code to run together with the production code and to execute and access functions from the production code.

The test case executer is responsible for the test case execution and provides the test results to the text suite executer. The test case executer also provides the API to simulate user interactions and to check the results of the interactions that can be used in the test case code. After the test case execution the result of the test case is stored into a browser cookie or into the web browser local storage.

The web browser local storage is a simple key value store in which a web application can store data and that can be also shared between browser tabs. As the key, the test case identifier is used and into the value the result of the test case execution is stored. If the test case was not successful, a log will also be stored.

Alternatively, browser cookies may be used to store test results. For example, in case that the browser does not support local web storage, a cookie may be used. Cookies may contain the same key value structure (e.g., as JavaScript Object Notation—or JSON).

Figure 2:
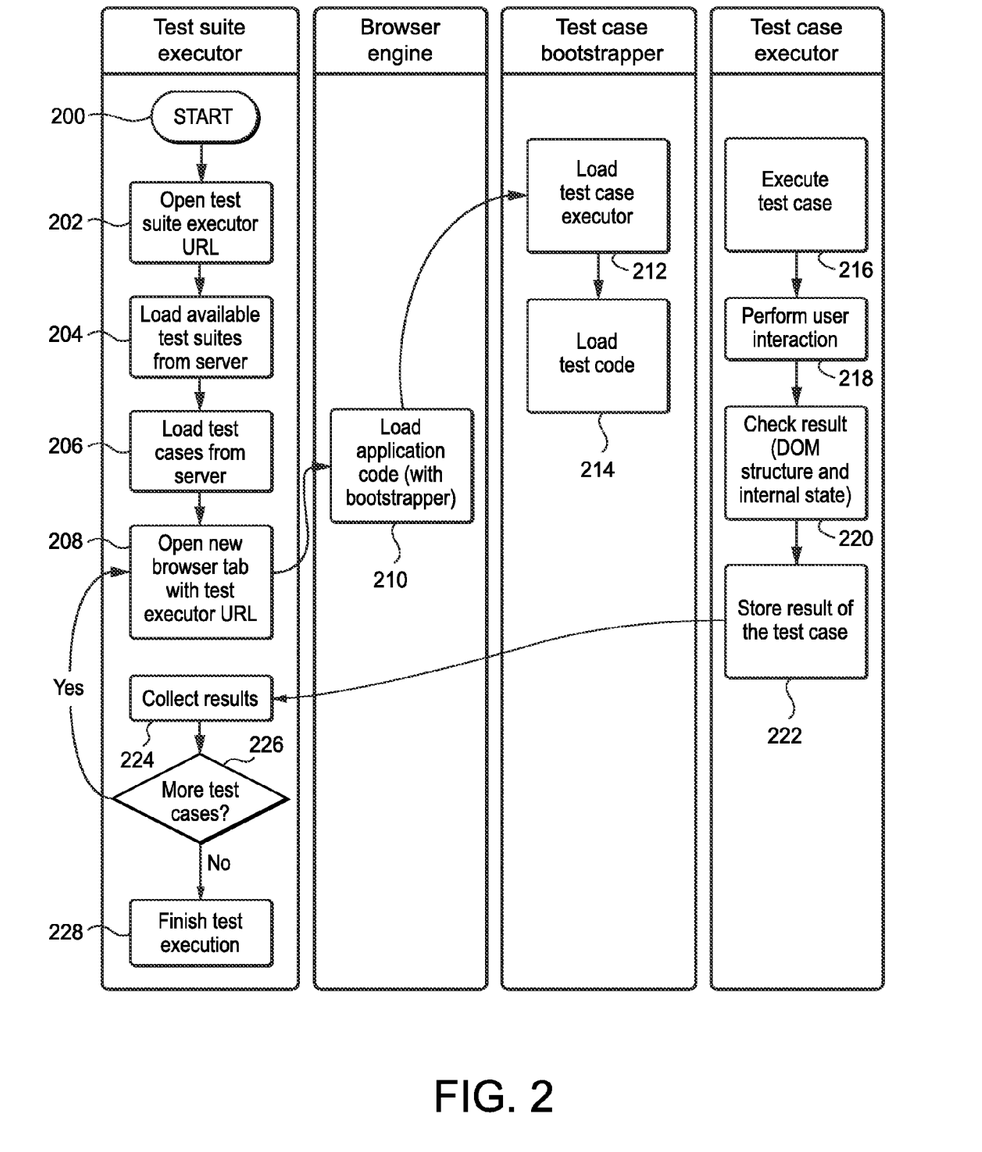
FIG. 2 depicts a flowchart for testing web applications, according to certain example embodiments.

FIG. 2 illustrates a flowchart of a method 200 for testing a web application in accordance with one or more embodiments. Method 200 may be performed, for example, to test a web GUI application in a production environment or in a development environment. As illustrated, method 200 comprises operations 202-228. However, it will be noted that in some embodiments operations 202-228 may be performed in an order different than shown, without one or more operations 202-228, combining two or more operations 202-228, and/or with one or more additional operations.

As shown in FIG. 2, the operations of method 200, in the illustrated embodiments, are performed by the test suite executer (e.g., operations 202-208 and 224-228), by the browser engine (e.g., operation 210), by the test case bootstrapper (e.g., operations 212-214), and by the test case executer (e.g., operations 216-222).

At operation 202, the test suite executer URL is opened in a web browser, such as browser 104. The test suite executer operates to load the test suite and test case definitions from a server (e.g., web server 108) and to execute each test case in a separate tab of the browser. The test suite executer is separate from the production code and can be accessed by opening a special URL on the web server. The URL for accessing the test suite executer may be restricted to be accessible only for the purposes of testing.

Upon opening the URL for the test suite executer, the main test framework code, containing the test suite executer is loaded from the server and injected in to the currently active page of the browser. Injecting the test suite executer results in the active page including the code (e.g., JavaScript or other script) in the code of the current active page. The current page with the test framework code injected may be referred to as the test framework page. The injected code of the test suite executer is then executed. For example, if the injected code is JavaScript, then the browser's JavaScript engine would run the code.

At operation 204, test suites and test case definitions are loaded from the server. In this operation, the test suite executer obtains the test suite definition list from the server, defining all, or some of the, test suites to execute on the application. Each test suite definition includes a unique suite identifier and a list of references defining the test cases that are included in the suite.

At operation 206, for each test suite, the corresponding test case definitions are downloaded from the server. In this operation, the test suite executer obtains the test case definitions for every test case. Each test case definition may be composed of a test case identifier and an application target (e.g., URL). The test case target is the application view or component the test case is testing. The test case definition does not contain the test code in certain example embodiments.

At operation 208, for each test case to be run, the test suite executer opens a new tab in the browser. A tab for running a test may be referred to as a test tab and provides a separate context for each test case to be run. From within the newly opened browser tab, a URL (e.g., the URL specified in the corresponding test case definition) is called with one or more predetermined URL parameters to activate the test case bootstrapper in the application being tested.

At operation 210, responsive to the URL and the passed parameters, the application code, which also contains the test case bootstrapper, is loaded in the new test tab.

At operation 212, the test case bootstrapper loads the test case executer.

At operation 214, the test case bootstrapper loads the test case code and runs the test case executer. The code for the test case executer and the test case code may be loaded to the browser from the server. Loading the test case executer and test case code includes downloading the test case executer and test case code and injecting them to the application.

At operation 216, the test case executer executes the test code within the context of the new test tab. According to an embodiment, as also noted above, execution of the test case code includes running of the injected JavaScript of the test case by the JavaScript engine of the browser.

At operation 218, possibly in conjunction with operation 216, user interactions defined in the test case are performed.

At operation 220, results of the executed test are observed. For example, the document object model (DOM) structure and internal state of the application may be examined. The results may include values or variables at defined stages of processing of the application, results of assertions and/or validation statements included in the test case code, etc.

At operation 222, the results of the test case execution are stored in the web browser local storage. The results are stored in shared data structures allocated for the purpose, or in browser cookies.

At operation 224, the test suite executer collects the results of the test case executions by monitoring the web browser local storage to where each of the test cases stores their respective results.

At operation 226, a determination is made as to whether any more tests are to be executed. According to an embodiment, the downloaded test suite definition would indicate the test cases to be run. In other embodiments, all test cases of one or more test suites are run in order to complete the testing. If more tests are to be executed, the method proceeds to operation 208, and operations 208-226 are repeated until all test cases have been executed.

When it is determined that all test cases have completed execution, the method proceeds to step 228 to complete test execution. Completion of the tests may include reporting the results of the tests. As noted above, results from each test may be stored in data structures in shared memory, and the test suite executer may access these stored results and report as appropriate. Reporting may include displaying in the browser, printing or storing a listing of the results, transmitting reports to a developer's email address, and/or the like.

Figure 3:
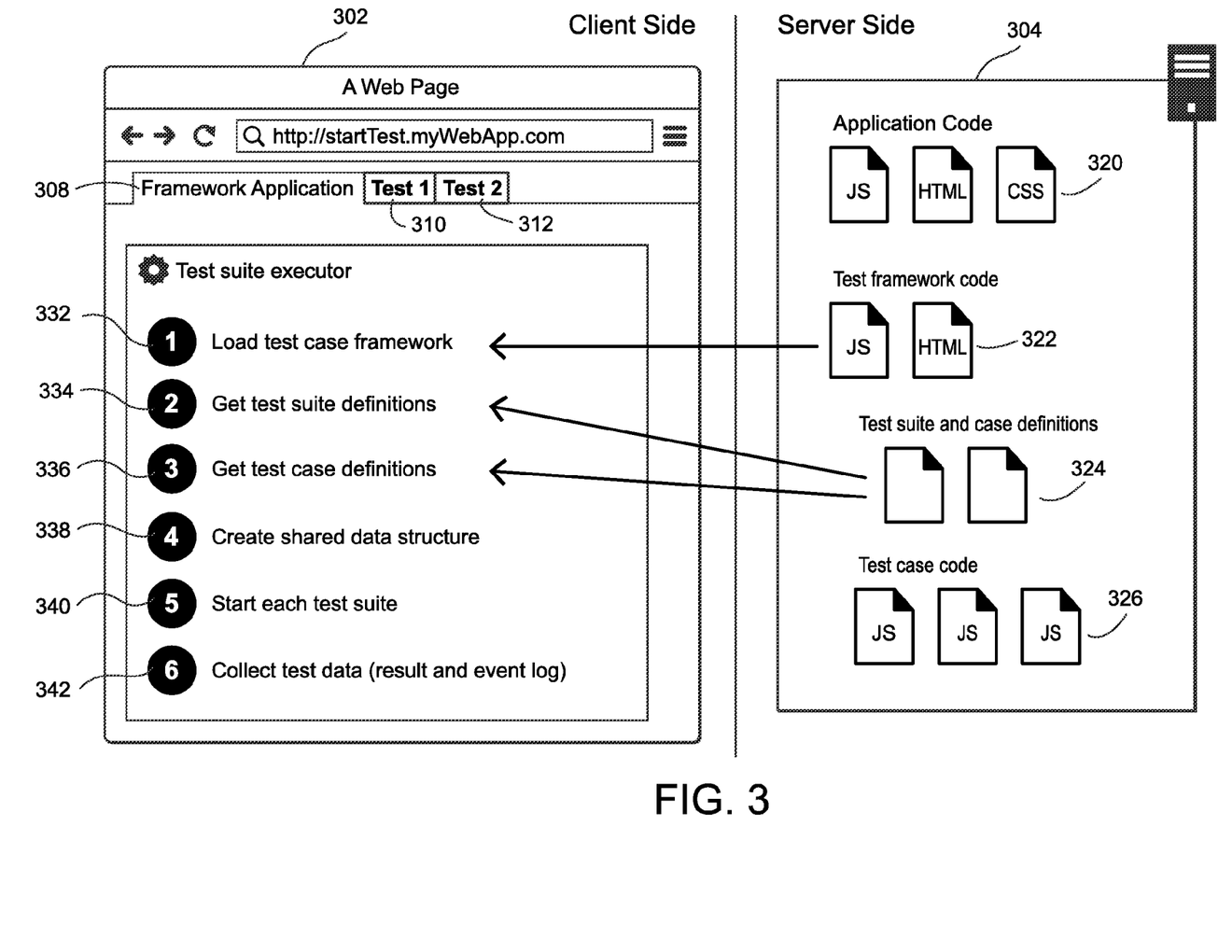
FIG. 3 depicts client- and server-side interactions by a test suite executer, according to certain example embodiments.

FIG. 3 depicts client- and server-side interactions of the test suite executer, according to certain example embodiments. As noted above, the test suite executer is loaded and activated in client browser 302, and interacts with server 304 to load and perform test cases.

Server 304 has in its storage, or has access to other storage that includes, application code 320, test framework code 322, test suite and test case definitions 324, and test case code 326. Application code 320, test framework code 322, test suite and test case definitions 324, and test case code 326, are downloaded by client browser 302 at various stages during the testing process.

As also noted in relation to FIG. 2, the test suite executer is downloaded to the browser and run by opening a URL, an example of which is shown in input field 306, to access a web server, such as server 304.

Based upon the URL specified, or a parameter in the URL, test framework code 322 is downloaded from server 304 to browser 302. The test framework code 322 includes the code for the test suite executer that is then executed in browser 302. Test framework code 322 may include one or more files of file types such as JavaScript, HTML, and/or other script-based or other languages capable of web GUI construction and/or control.

When downloaded, the test framework code, or portions thereof, is injected to the current web page, e.g., tab 308. The test suite executer, downloaded as part of the test framework code 322, may execute in tab 308 in browser 302.

Within the context of browser tab 308, several operations including one or more of operations 332-342 may be performed. Operation 332 represents the downloading of the test case framework 322 from server 304, as described above.

When the test suite executer has started in tab 308, it may perform each of the operations 334-342. At operation 334, test suite definitions are downloaded. Test suite definitions may be stored on server 304 in any of a number of formats suitable for specifications and/or templates, such as XML, etc. In this step the test suite executer obtains the test suite definition list from the server, defining all test suites to execute on the application. Each test suite definition includes a unique suite identifier and a list of one or more references defining the test cases that belong to the suite.

At operation 336, test case definitions are downloaded. The test case definitions too may be specified in a format such as, but not limited to, XML. Test suite definitions may indicate the identities, types, and locations of the available test suites. Test case definitions may indicate the identities, types, and location of each test available in a test suite. In this step, the test suite executer obtains the test case definitions for every test case. The test case definition includes a test case identifier and an application target (e.g., specified as a URL). The test case target may be the application view or component the test case is designed to test. Test case code is not included in the downloaded test case definitions.

At operation 338, test suite executer creates and/or initializes shared data structures for use in collecting and communicating results generated by the execution of test cases. In this operation, the test suite executer creates and initializes the shared data structure used to share test case results and test data between the test cases, which are executed in separated and different browser tabs. This structure is used to from the test cases to communicate the test result to the test suite executer. The structure may also be used to communicate test results between test cases. The shared data structures may be formed based upon the information available from the test suite definitions and/or the test case definitions. For example, the number of data structures to be created may be based upon the number of test cases to be executed. Each data structure may be configured to hold the values written out and/or observed during and/or after each of the test cases. The shared data structures may be formed in browser local memory that can be accessed by a plurality of the pages.

At operation 340, as described with respect to operation 208 above, the test suite executer opens for each test case in the test suite, a new browser tab (e.g., tabs 310 and 312) using the defined application target URL of the test case and adding the test case run parameter containing the test suite identifier and the test case identifier.

At operation 342, the test suite executer waits for each test case execution to finish. This may be performed by monitoring a shared data structure in the web browser local store, by using a specific browser cookie that also contains a similar data structure depending on the web browser supports local web storage, or in some other way. For example, each test case may set a flag in its results data structure to indicate it has completed its execution, and this may be monitored appropriately.

Figure 4:
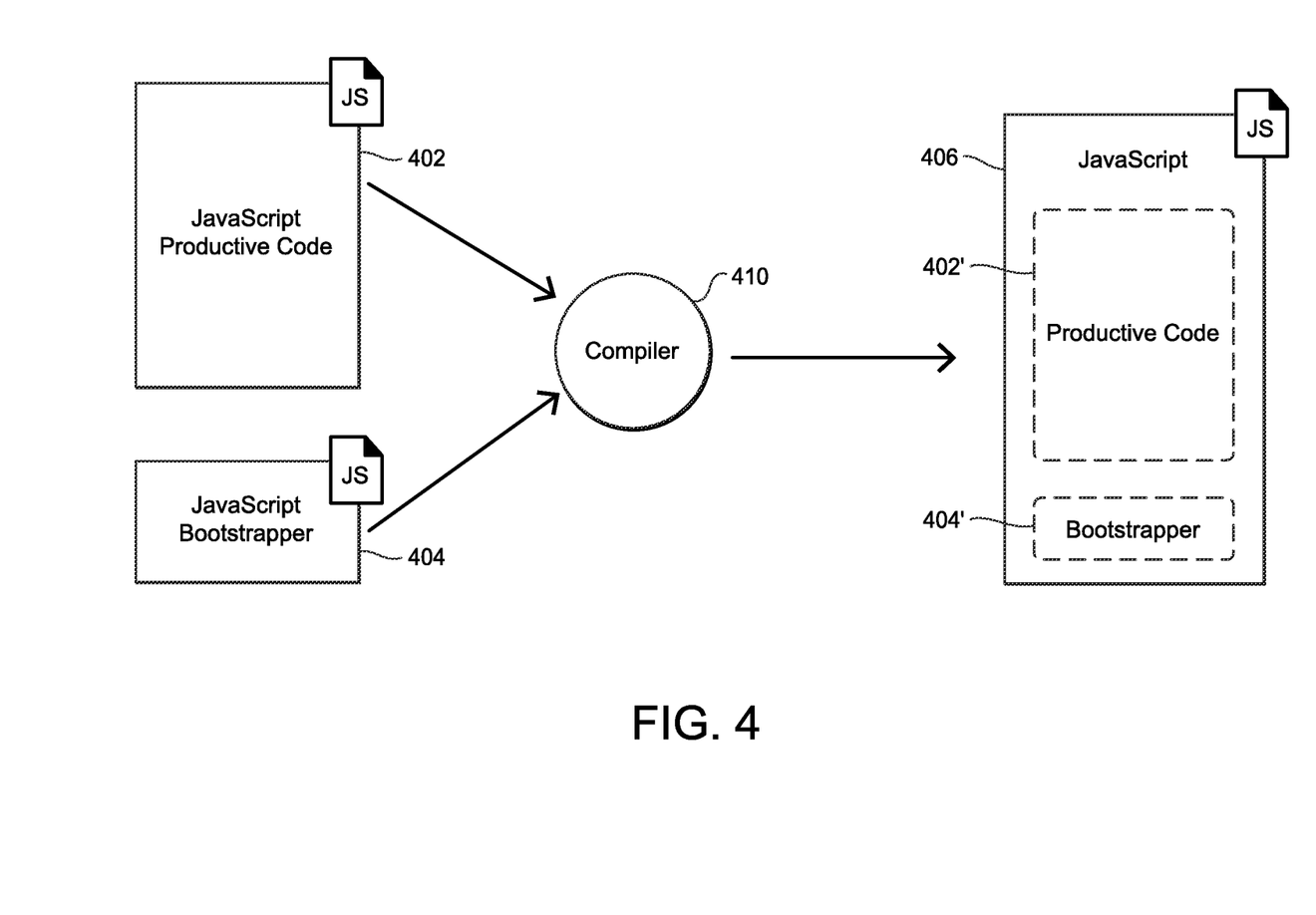
FIG. 4 depicts embedding test bootstrapping code in an application, according to certain example embodiments.

FIG. 4 depicts embedding test bootstrapping code in an application, according to certain example embodiments. The test case bootstrapper may be added to the production code by the compiler 410 during the compile process of the production code, or in some other instances, can be manually added to the production code after the compile process. The test case bootstrapper 404 can be added by copying it to the production code 402 or by referencing the corresponding bootstrapper JavaScript (or other language file) using an HTML script tag or the like. The output of the compiling may be JavaScript file 406 that has both, production code 402' and test case bootstrapper code 404' embedded therein. It will be appreciated that compiling need not necessarily result in machine code. Rather, for example, the output of compiling a JavaScript source file may be another JavaScript file that may include code optimizations and the like. As another example, source code may be compiled into code executable by a virtual machine that is not strictly machine code. It will be appreciated that production code 402 and 402' of the application may not be identical, e.g., because of the performed compiling and/or obfuscation. For similar reasons, test case bootstrapper 404 and 404' may not be identical.

Figure 5:
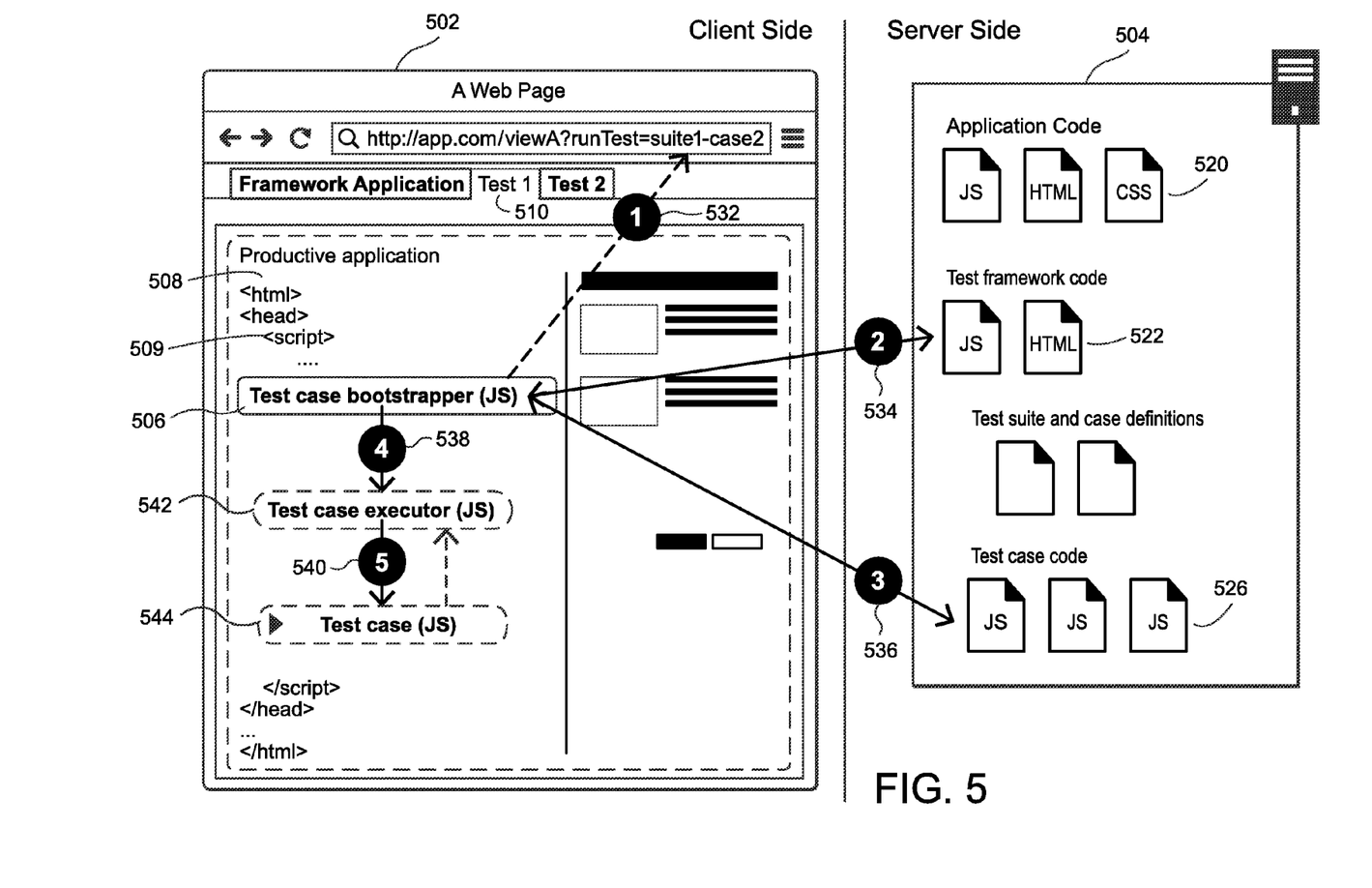
FIG. 5 depicts client- and server-side interactions by the test bootstrapper in the application being tested, in accordance with certain example embodiments.

FIG. 5 depicts client- and server-side interactions by the test bootstrapper included the application being tested, in accordance with certain example embodiments.

After the application (e.g., from application code 320 shown in FIG. 3) is loaded into browser 502, the test case bootstrapper 506 included in the application, in an operation 532, checks the provided URL for a test run parameter including the test suite and/or test case identifier. The application (and the test code bootstrapper called for executing a particular test as specified in the URL) may operate in its own browser tab 510. Based upon the test suite/test case identifiers provided in the URL, in operation 536, the appropriate test case code 526 is identified and loaded from the server 504. The test case executer, which can be downloaded from test framework code 522 on server 504, is injected into the production code (e.g., application code 508) by adding a HTML script tag (e.g., item 509) that references the code of the test case executer 542. After the test case executer is loaded the test case code 544 will be loaded, injected to the production code, and executed. To perform a test case, the corresponding test case code 544 may provide a run method or the like. Operations 538 and 540 show, for example, that test case bootstrapper 506 activates test code executer 542, and that test code executer 542 activates test case code 544.

Figure 6:
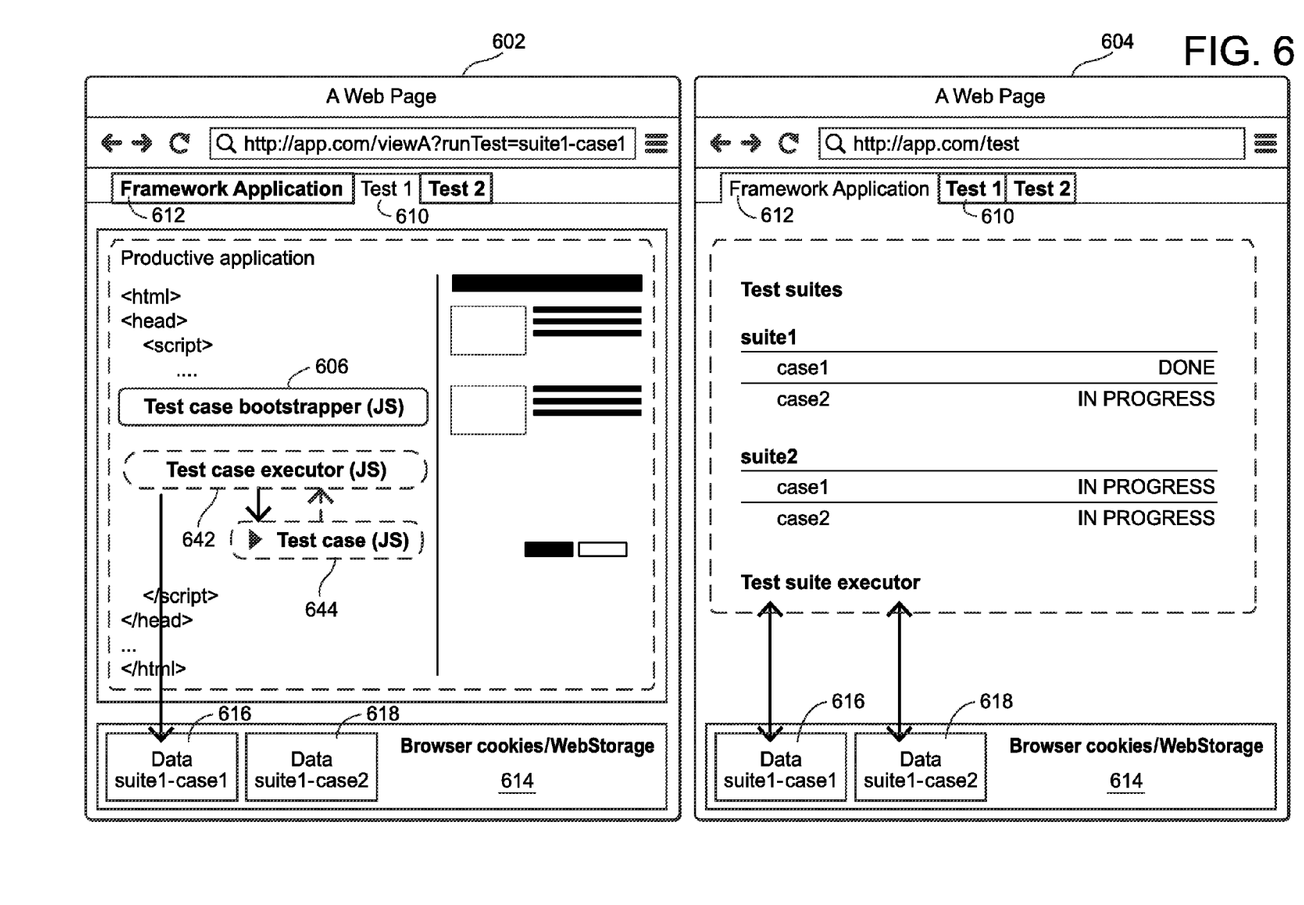
FIG. 6 depicts the test case access by the application code and user interface elements, in accordance with certain example embodiments.

FIG. 6 depicts the test case access by the application code and user interface elements, in accordance with certain example embodiments.

Test case executer 642 provides an API that can be used in test case code 644, e.g., to perform user interactions and to validate the execution of an interaction. Test case executer 642 supports different user interaction such as, for example, any kind of mouse events on a DOM object in the browser such as a mouse click on a button, as well as any kind of keyboard events that are possible (e.g., entering a value into a text box). Test case executer 642 is also configured to initiate the test case execution.

FIG. 6 illustrates two instances of browser 602. In one instance, a tab 610 for a test "Test1" is shown as the active tab (e.g., the tab in the foreground), and other tabs including tab 612 for the test framework are in the background. In the other instance, tab 612 for the test framework is active and the other tab including tab 610 for "Test1" is in the background.

Browser 602 with tab 610 being active graphically illustrates the test case executer 642 interacting with a test case 644 (e.g., test case 1 from test suite 1). Based upon its interaction with the test case 644, test case executer 642 stores or updates results in results data structures 616 in shared memory 614.

Browser 602 with tab 612 being active graphically illustrates a summary of the current tests being displayed by the test suite executer. The test suite executer may access the shared data structures 616 and 618 to read result data and/or update result data stored in the shared structures by one or more test case executers, such as test case executer 642 that stored results in data structure 616.

Figure 7:
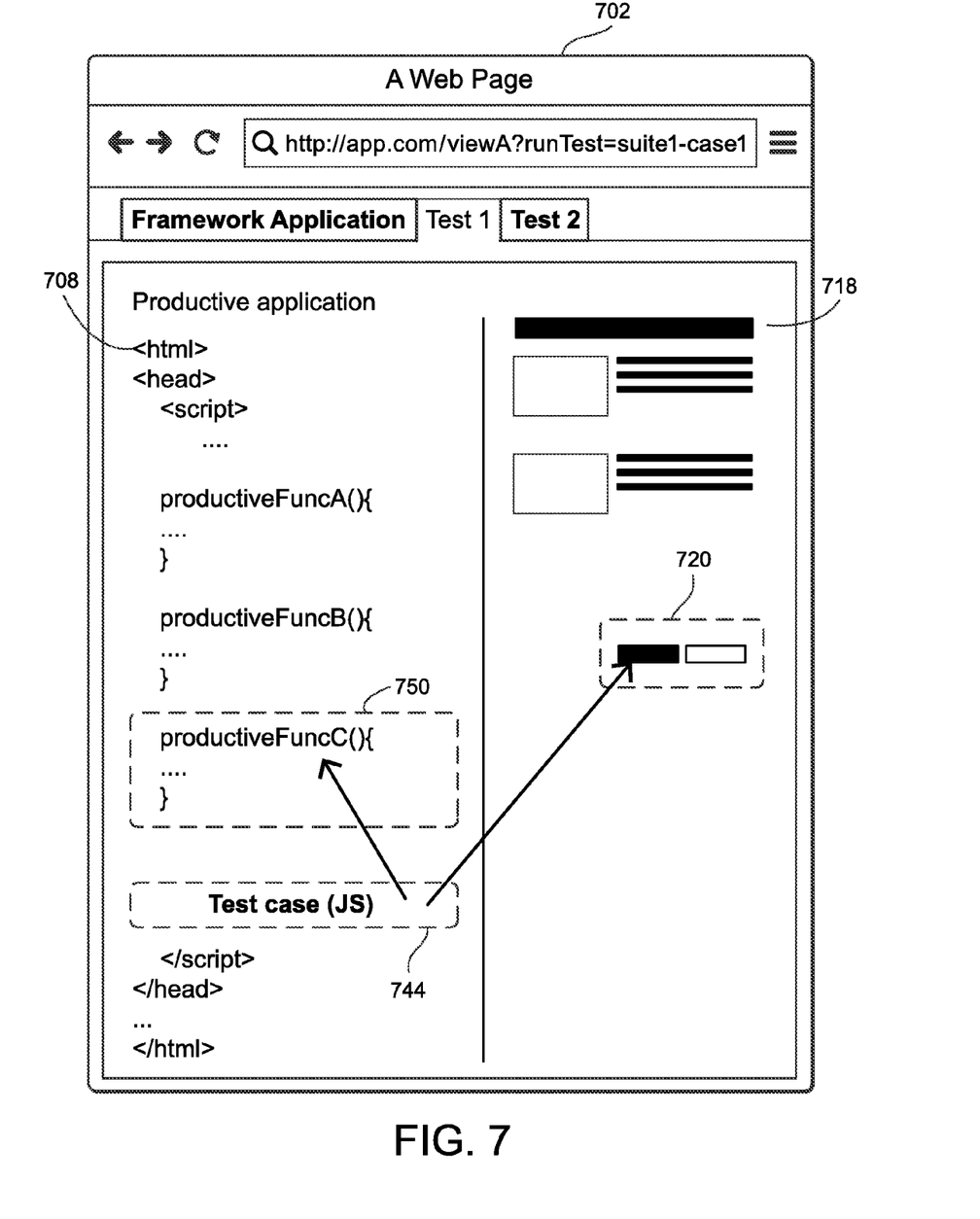
FIG. 7 depicts the test case access by the application code and user interface elements, in accordance with certain example embodiments.

FIG. 7 depicts test case code access by the application code and user interface elements, in accordance with certain example embodiments.

The test case code 744 is compiled/obfuscated together with the production code 708 and the test case executer (not separately shown in FIG. 7). The obfuscation/compiling process may be done during the build process of the application, and the obfuscated code may be provided and/or stored by the server. This enables the calling of internal functions, such as productiveFuncC( ) 750 in the application code from inside test case code 744, as well as by using the API provided by the test case executer. Each test case code may be stored in a separate JavaScript file that is assigned a unique name composed by the test suite identifier and the test case identifier. In certain instances, the identifier for test suites and test case may be a simple string.

As shown in FIG. 7, the test case code 744 can use the internal functions of the productive code, as well as the API of the test case executer, to access UI elements (e.g., 720) of the application to simulate user interactions and to validate the result of the interaction. This advantageously enables the running of stable and fast test cases to validate a production installation of a web application in certain example embodiments.

Although certain example embodiments have been described as relating to separate tabs, it will be appreciated that separate browser windows may be used in place of or together with tabs. It also will be appreciation that although certain example embodiments have been described in connection with JavaScript, the techniques disclosed herein may be used in connection with other scripting languages and/or the like.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

It is to be understood that this disclosure is not to be limited to the disclosed embodiments, but on the contrary, is intended to cover various modifications and equivalent arrangements included within the spirit and scope of the appended claims.

What is claimed is:

1. A method of testing an application on a computer system that includes at least one hardware processor, the method comprising:

loading, within a first context of a web browser, client-side code for an application, the client-side code including test bootstrap code;

responsive to a first parameter received from a test suite executer, executing, within the first context of the web browser, the test bootstrap code included in the web application by using the computer system, wherein the web application and the test suite executer run in the web browser;

retrieving, by the executed test bootstrap code, a test case to be run on the web application and a test case executer to execute the test case, wherein the retrieving comprises:
dynamically requesting, based on execution of the test bootstrap code, the test case from a remote computer;
responsive to the dynamic request, receiving the test case and the test case executer, the test case and the test case executer being client-side code that is to be loaded within the first context of the web browser; and
injecting the client-side code of the received test case and the test case executer within the first context of the web browser;

executing the injected client-side code within the first context of the web browser; and storing results based on execution of the retrieved test case.

2. The method according to claim 1, wherein the test bootstrap code is compiled together with other client-side code for the web application.

3. The method of according to claim 1, wherein the injected test case and the injected test case executer are compiled and/or obfuscated together with the web application.

4. The method according to claim 1, wherein the executing the test case comprises performing said execution of the test case by the injected test case executer.

5. The method according to claim 4, wherein the performing execution of the test case comprises:
inputting to the web application, by the injected test case executer, user actions that cause execution of processing steps by the web application; and
validating the results, wherein the results are based upon the executed processing steps.

6. The method according to claim 1, wherein, as part of executing the test case, one or more internal functions of the web application is/are called from within the injected test case code.

7. The method according to claim 1, wherein the received test case code is received as a separate file.

8. The method according to claim 1, further comprising starting the test suite executer in the browser, wherein the starting includes:
loading code of the test suite executer from a computer;
injecting the loaded code of the test suite executer to a page of the web browser; and
executing the injected code of the test suite executer to provide the first parameter.

9. The method according to claim 8, further comprising:
obtaining, responsive to requests from the test suite executer, one or more test case definitions including a test case definition for the test case, wherein the test case definition for the test case comprises an identifier for the test case and an address of the web application; and
configuring one or more data structures in a shared memory for storing the results.

10. The method according to claim 9, wherein the test case code is not included in the obtained test definitions.

11. The method according to claim 9, further comprising:
upon obtaining a test case definition for the test case, generating a new browser context that is separate from the context in which the test suite executer is running; and
accessing, by the test case executer, the web application from within the generated new browser context to cause said test bootstrap code included in the web application to execute within the first context.

12. The method according to claim 9, further comprising:
detecting completion of the execution of the test case; and reporting the results from the shared memory.

13. The method according to claim 1, wherein the client-side code of the web application comprises compiled and/or obfuscated code.

14. The method according to claim 1, wherein the testing includes white-box testing.

15. A computer system for testing a web application, the computer system comprising:
first processing resources including at least one processor and a memory;
second processing resources communicatively connected to the first processing resources over a network; and
storage connected to the second processing resources, the storage being configured to store a plurality of test cases, each said test case including (a) interactions between the web application and components external to the web application that were gathered during a run of the web application and received user input from a user, and (b) assertions to be made to the web application once the web application reaches a desired test state,
the at least one processor configured to perform operations comprising:
responsive to a first parameter being received from a test suite executer, execute, within a first context of a web browser that is running on the computer system, test bootstrap code included in the web application, wherein the web application and the test suite executer are both run within the web browser;
retrieve, in accordance with the executed test bootstrap code, a test case to be run on the web application and a test case executer to execute the test case, the retrieved test case and the retrieved test case executer being client-side code that is loaded within the first context of the web browser;
execute the retrieved test case within the first context of the web browser, which is the same context in which the web application is executing, or to be executed; and
store, to a storage medium, results from executing the retrieved test case,
wherein retrieval of the test case comprises:
requesting, in accordance with the executed test bootstrap code, the test case from the second processing resources;
responsive to the requesting, receiving the test case and the test case executer from the storage; and
injecting the received test case and the test case executer to the web application as client-side code that is to be executed within the first context of the web browser.

16. The computer system according to claim 15, wherein the injected test case and the injected test case executer are compiled and/or obfuscated together with other client-side code of the web application.

17. The computer system according to claim 15, wherein the executing the retrieved test case comprises performing said execution of the test case by the injected test case executer.

18. The computer system according to claim 15, wherein the at least one processor is configured to perform operations further comprising starting the test suite executer in the web browser, wherein the starting includes:
receiving code of the test suite executer from the second processing resources;
injecting the received code of the test suite executer to a page of the web browser; and
executing the injected code of the test suite executer to provide the first parameter.

19. A non-transitory computer readable storage medium having stored thereon instructions, that when executed by a computer, cause the computer to perform operations comprising:
loading, within a first context of a web browser, client-side code for a web application, the client-side code including test bootstrap code;
responsive to a first parameter received from a test suite executer, executing, within the first context of the web browser that is running on the computer system, the test bootstrap code included in the web application, wherein the web application and the test suite executer are both run within the web browser;
dynamically requesting, based on execution of the test bootstrap code, a test case from another computer that is remotely located from the computer system on which the web browser is running, the test case and a test case executer being client-side code that is to be loaded within the first context of the web browser;
receiving the requested test case;
dynamically injecting the client-side code of the received test case and the test case executer within the first context of the web browser;
executing the test case within the first context of the web browser; and
storing, to a storage medium, results from executing the test case.

* * * * *